United States Patent [19]
Moore

[11] 3,917,534
[45] Nov. 4, 1975

[54] FILTER SECTOR

[75] Inventor: Richard D. Moore, New Boston, N.H.

[73] Assignee: Plastic Techniques, Inc., New Boston, N.H.

[22] Filed: Apr. 17, 1974

[21] Appl. No.: 461,660

[52] U.S. Cl. ............................................... 210/486
[51] Int. Cl.² .......................................... B01D 39/00
[58] Field of Search .......... 210/330, 331, 340, 341, 210/345, 486

[56] References Cited
UNITED STATES PATENTS

| | | | |
|---|---|---|---|
| 1,685,085 | 9/1928 | Hoyt .............................. | 210/486 X |
| 2,338,549 | 1/1944 | Shriver et al. ...................... | 210/486 |
| 2,591,720 | 4/1952 | Peterson ......................... | 210/359 X |
| 3,193,105 | 7/1965 | Putnam........................... | 210/486 X |
| 3,473,669 | 10/1969 | Davis et al. ......................... | 210/486 |
| 3,679,061 | 7/1972 | Davis................................. | 210/486 |

*Primary Examiner*—Samih N. Zaharna
*Assistant Examiner*—Richard W. Burks
*Attorney, Agent, or Firm*—Bain, Gilfillan & Rhodes

[57] ABSTRACT

An improved filter sector which provides an improved fluid flow pattern along the sides of the filter by interconnecting each neck groove with a plurality of diagonal grooves formed on the filter sides. The improved filter sector may be molded of a suitable plastic material and improved structural rigidity may be imparted to the molded filter sector which is a hollow structure by providing a plurality of through-posts molded between the molded plastic providing the sides of the sector, by providing a plurality of metal rods molded integrally and internally of the sector and by filling the hollow interior of the molded plastic sector with a second predetermined plastic material.

3 Claims, 3 Drawing Figures

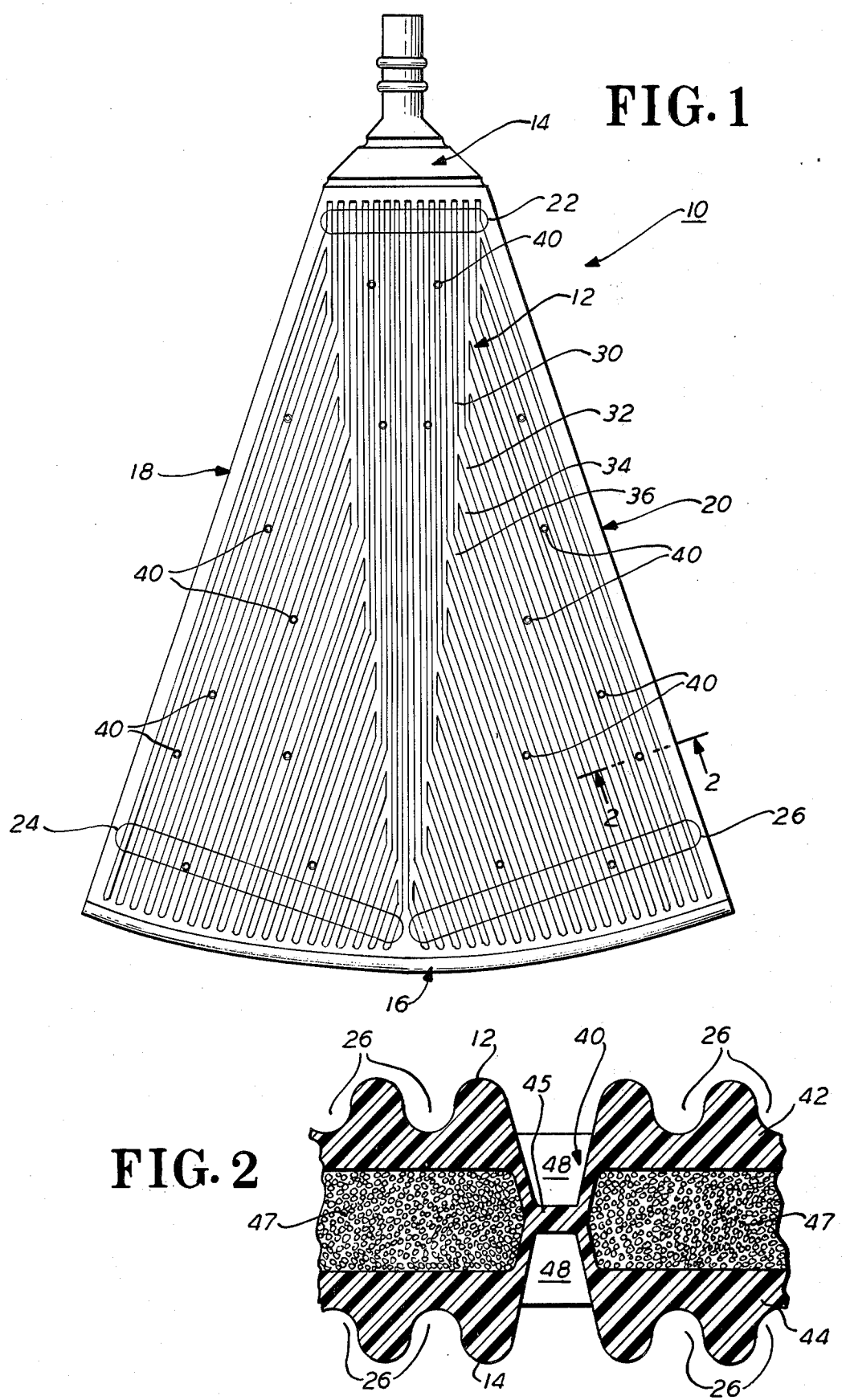

FILTER SECTOR

BACKGROUND OF THE INVENTION

The present invention relates to an improved filter sector in general, and in particular relates to a molded plastic filter sector having an improved fluid flow pattern along its sides and which is of increased structural rigidity.

As is known to those in the filter sector art, disc filters are common in the filtration art and the typical construction of a disc filter includes a series of generally fan-shaped filter sectors secured together to provide a generally circular or annular construction by being secured at close intervals along a rotatable shaft. Each filter sector is covered individually with a filter medium to provide filtering on both sides of the filter sectors.

As is further known to those skilled in the filter sector art, the sides of the filter sectors are provided with grooves which are interconnected with passages formed in the supporting shaft through which a vacuum is drawn to draw liquid filtered through the filter medium and which flows in a fluid flow pattern along the grooves provided on the faces of the filter sectors. In the prior art, typically, the filter sector sides are provided with a plurality of neck grooves extending linearly from the neck of a filter sector toward its opposite arcuate end and a plurality of diagonal grooves formed on each side of the neck grooves parallel to the edges of the filter sector. As shown in the filter sectors disclosed in U.S. Pat. Nos. 1,685,085 and 2,591,720, all, or substantially all, of the diagonal grooves interconnect with only a single neck groove, namely, the outside neck groove adjacent the plurality of diagonal grooves. Hence, all of the fluid flow through the plurality of diagonal grooves flows into only one neck groove and thus the plurality of neck grooves are restricted in passing only the amounts of fluid which can be accommodated by the single neck groove into which the diagonal grooves are connected. This condition unwantedly restricts the volume of fluid flow through the diagonal grooves for a unit period of time and further provides a generally uneven fluid flow pattern across the sides of the filter sectors.

While numerous filter sector structures are known to the art, for example wooden filter sectors, plastic filter sectors and combinations thereof, the plastic filter sectors are particularly desirable due to their resistance to corrosive materials and to their comparative lightness in weight and its attendant reduction in energy required for rotation. However, such plastic filter sectors suffer, typically, from one general disadvantage, namely, their comparatively weak structural rigidity.

SUMMARY OF THE INVENTION

The present invention provides an improved filter sector having an improved fluid flow pattern across the sides of the filter sector whereby each neck groove is interconnected with a plurality of diagonal grooves.

Further, the improved filter sector of the present invention provides an improved molded filter sector of increased structural rigidity.

DESCRIPTION OF THE DRAWINGS

FIG. 1 is an elevational view showing a side of the improved filter sector of the present invention and showing, in particular, the improved fluid flow pattern provided along the side of the filter sector;

FIG. 2 is a partial cross-sectional view taken generally along the line 2—2 in FIG. 1 in the direction of the arrows.

DESCRIPTION OF THE INVENTION

Figure 3:
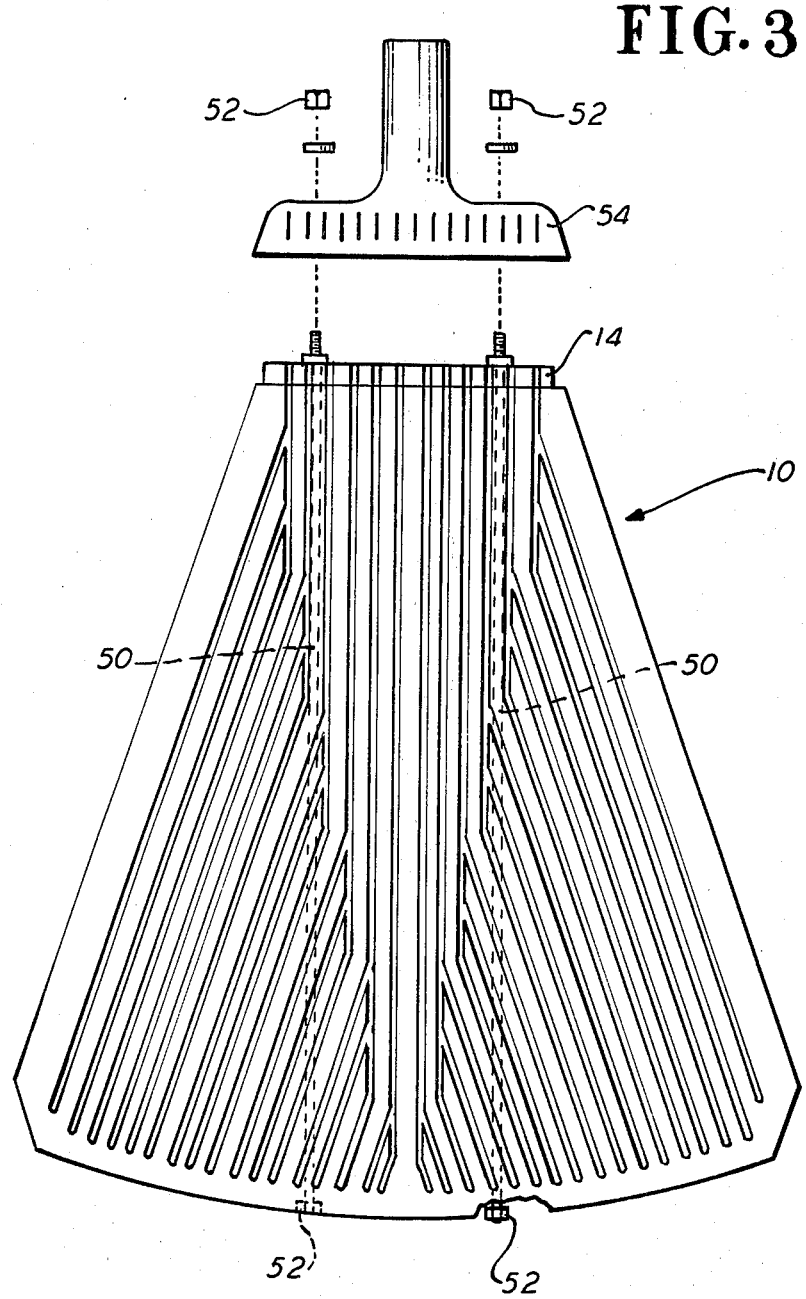
FIG. 3 is an elevational view of an alternate embodiment of the improved filter sector of the present invention.

Referring now to FIG. 1, there is shown an improved filter sector according to the present invention and indicated generally by numerical designation 10 and which filter sector is of generally fan-shaped configuration and includes a pair of generally opposed and parallel sides, side 12 being shown in elevation and it being understood that the opposite side of the filter sector 10 is the same as side 12 shown in FIG. 1. The improved filter sector 10 includes a neck portion 14 at one end thereof and a generally arcuate end 16 at the opposite end thereof and a pair of generally radially disposed edges 18 and 20.

Referring now specifically to the outer surface of side 12 of the improved filter sector, and, of course, equally to the outer surface of the opposite side not shown, the outer surface of side 12 is provided with a plurality of generally parallel neck grooves 22 extending in a straight line or linearly from the generally arcuate end 16 to the neck 14 of the improved filter sector 10.

Also formed on the outer surface of the side 12 are two pluralities of generally parallel diagonal grooves 24 and 26 with each plurality of diagonal grooves as shown, being disposed on one side of the plurality of neck grooves 22 and extending linearly and parallel to one of the generally radially disposed edges 18 or 20.

It will be noted that each of the neck grooves 22 interconnects with a predetermined number of diagonal grooves of one of the pluralities of diagonal grooves 24 or 26. More specifically, and with particular regard to the embodiment of the present invention illustrated in FIG. 1, neck groove 30 interconnects with diagonal grooves 32, 34 and 36 of the plurality of diagonal grooves 26. Hence, an improved fluid flow pattern is provided along each side of the improved filter sector 10 due to the fact that each neck groove of the plurality 22 carries or accommodates the fluid flowing through a plurality of the diagonal grooves and that all of the diagonal grooves of each plurality do not interconnect with only a single neck groove as is the case of the tupical prior art filter sector as noted above.

Referring now to FIG. 2, it will be understood that the improved filter sector of the present invention may be molded of a suitable plastic material, for example, a suitable cross-linked high density polyethylene, and that such improved plastic filter sector may be formed, for example, by being molded by the rotational molding process. Such rotational molding process provides an improved plastic filter sector of generally hollow construction having a hollow interior thereby otherwise rendering the molded filter sector generally weak in structural rigidity.

However, in accordance with the further teaching of the present invention, the improved filter sector of the present invention may be suitably molded of a suitable plastic material, as noted above, and a plurality of through-posts 40 may be molded into the improved filter sector by being molded integrally with the layers of the molded plastic material forming the sides 12 and 14 of the improved filter sector 10. The through-posts 40 by integrally interconnecting the layers 42 and 44 provide the molded plastic improved filter sector of the present invention with increased structural rigidity.

As may be seen from FIG. 2 the through-posts 40 are generally cylindrical and tapering inwardly from each of the layers 42 and 44 toward the center thereof where they are provided with an integrally formed central wall 45 formed parallel to the layers 42 and 44. The central wall 45 has been found to be particularly useful it that it insures that if there is a break or rupture of the filter medium or bag on one side of the improved filter sector, there is no flow through the filter sector of the liquid or slurry being filtered. It has been found that larger outer diameter of the frustum spaces 48 may be advantageously five-eighths inch and that the inner smaller diameter may be advantageously one-fourth inch. Further it has been found that the central wall 45 may be advantageously one-eighth inch in thickness. Also it has been found that in accordance with the present invention that the through-posts 40 of the shown and described configuration provide unexpectedly greater increased structural rigidity than a through-post of straight-walled configuration.

Referring still further to FIG. 2, and in accordance with the further teaching of the present invention, it has been found that the molded plastic filter sector of the present invention, having the generally hollow interior referred to above, can be provided with increased structural rigidity by filling the hollow interior of the filter sector with suitable plastic material 47, such as for example, a foam such as a suitable high-density foam which may be sealed off with a suitable polyester fibergalss compound, for example, by pouring a layer of polyester resin (which may be loaded with chopped fiberglass) over the exposed foam in the neck of the sector; this prevents the foam from absorbing any water as well as protecting it from the alternate suction and blow of the filler machine. Such foam upon hardening provides the improved filter sector of the present invention with increased structural rigidity.

Referring now to FIG. 3, there is shown an alternate or further embodiment of an improved filter sector of the present invention wherein the improved filter sector is a plastic filter sector, formed, for example, as taught above with regard to the embodiment of FIGS. 1 and 2 of a suitable plastic material but which may be further provided with increased structural rigidity by having a plurality of metal rods 50 and 52 formed integrally therewith by molding the plastic filter sector around the metal rods 50. The metal rods, as shown in FIG. 3, may be provided with threaded portions at their opposite ends for threadedly receiving bolts 52 as shown for further securing the structural integrity between the metal rods 50 and the plastic filter sector 10 and also for securing a metal neck portion 54 to the neck end 14 of the filter sector. Such plurality of metal rods 50 provide the plastic filter sector of the present invention with increased structural rigidity.

It will be understood by those skilled in the filter sector art that the above teachings with regard to the specific embodiments of the present invention illustrated in the drawings is merely illustrative of the present invention and that many modifications and variations may be made in the present invention without departing from the spirit and the scope thereof.

What is claimed is:

1. An improved filter sector, said filter sector being of generally fan-shaped configuration and including a pair of generally opposed and parallel sides, a neck at one end thereof and a generally arcuate end at the opposite end thereof, and a pair of generally radially disposed edges, said sides for having a fluid flow pattern therealong extending from said generally arcuate end toward said neck, the improvement comprising:

a pair of generally fan-shaped and generally opposed parallel layers of predetermined molded plastic material providing said sides;

a plurality of through-posts of said predetermined plastic material extending between and molded integrally with said pair of layers of predetermined material and for providing said filter sector with increased structural rigidity;

said through-posts being of generally cylindrical configuration and tapering inwardly from said layers and including an integrally molded central wall of said predetermined plastic material extending parallel to said layers and separating said generally opposed and parallel sides having said grooves formed thereon;

means on the outer surface of each of said sides providing a plurality of parallel neck grooves extending linearly from said generally arcuate end to said neck of said sector;

means on the outer surface of each of said sides providing two pluralities of parallel diagonal grooves, each of said plurality of diagonal grooves disposed on one side of said plurality of neck grooves and each of said plurality of parallel diagonal grooves extending linearly and parallel to one of said generally radially disposed edges; and each of said neck grooves interconnecting with a predetermined number of said diagonal grooves of one of said pluralities of diagonal grooves to provide an improved fluid flow pattern along said sides extending from said generally arcuate end toward said neck.

2. An improved filter sector according to claim 1 wherein each of said neck grooves interconnects with three of said diagonal grooves of one of said pluralities of diagonal grooves to provide said improved fluid flow pattern.

3. An improved filter sector according to claim 1 wherein said filter sector further includes a plurality of metal rods molded integrally therewith and internally thereof and extending linearly between said neck and said generally arcuate end and for providing said improved filter sector with increased structural rigidity.

* * * * *